United States Patent

Cohen et al.

[11] B 4,061,572
[45] Dec. 6, 1977

[54] OIL FILTER

[75] Inventors: Lester Samuel Cohen, Broomall, Pa.; William Dein Lewis, Wilmington, Del.

[73] Assignee: E. I. Du Pont de Nemours and Company, Wilmington, Del.

[21] Appl. No.: 449,989

[22] Filed: Mar. 11, 1974

[44] Published under the second Trial Voluntary Protest Program on March 30, 1976 as document No. B 449,989.

[51] Int. Cl.² .............................................. B01D 11/00
[52] U.S. Cl. .................................... 210/168; 210/206; 23/267 B
[58] Field of Search ............... 210/199, 205, 207, 209, 210/198, 501, 506, 168; 252/56 R, 59; 23/267 B, 267 D, 272

[56] References Cited

U.S. PATENT DOCUMENTS

| 1,245,626 | 11/1917 | Shaffer | 23/267 D |
| 3,231,324 | 1/1966 | Young | 210/502 X |
| 3,336,223 | 8/1967 | Kneeland | 210/506 X |
| 3,343,918 | 9/1967 | Moulder | 23/267 D |
| 3,687,849 | 8/1972 | Abbott | 252/56 R X |
| 3,772,193 | 11/1973 | Nelli et al. | 210/205 X |

Primary Examiner—Frank A. Spear, Jr.
Assistant Examiner—Ferris H. Lander

[57] ABSTRACT

An improved oil filter is provided which enables oil viscosity index improver and beneficial additives to be metered into the oil throughout its normal useful life. A conventional oil filter is modified by placing in the filter upstream from the filter element an oil-soluble, solid oil viscosity index improver such as a copolymer of ethylene and propylene with up to 10% by weight of 1,4-hexadiene, preferably in sheet form. Other additives can be dispersed in the improver. The improver is in association with means to limit contact of the copolymer with circulating oil. Preferably the contact limiting means is a perforated metal sheet.

1 Claim, 2 Drawing Figures

OIL FILTER

BACKGROUND OF THE INVENTION

1. Field of Invention

This invention relates to oil filters and more particularly to such filters which add viscosity index improver to oil over its normal useful life.

2. Prior Art

It is well known that mineral lubricating oils and functional fluids have a tendency to become thin at elevated temperatures while becoming thick at low temperatures, and thus it is generally necessary to incorporate additives which improve their viscosity-temperature relationships. For example, in the case of a crankcase lubricating oil in a cold engine, it is desirable that the oil not become so thick that it is difficult to start the engine. On the other hand, when the engine is hot, it is necessary that the oil be sufficiently viscous that an oil film is maintained between the moving parts.

The viscosity-temperature relationship of an oil at temperatures in the range of 110° to 210°F. is known as its viscosity index. Thus, additives which retard the tendency of the oil to thin as the temperature is raised from 100° to 210°F. are known as viscosity index improvers. Viscosity index improvers which are known include polymers of methacrylate esters having long alkyl chains, polyisobutylene polymers, and polyalkyl styrenes. The methacrylate type improvers are described in U.S. Pat. No. 2,114,233, issued Apr. 12, 1938 to Harry Trainor et al. and U.S. Pat. No. 2,737,496, issued Mar. 6, 1956 to Willard E. Catlin. The polyisobutylene improver is described in U.S. Pat. No. 2,130,507, issued Sept. 20, 1938 to Michael Otto et al. Polyalkyl styrene improvers are described in U.S. Pat. No. 2,072,120, issued Mar. 2, 1937 to Louis A. Mikeska et al. Many patents have issued subsequently to those above described which disclose many types of additives which can be included with the improver.

Viscosity index improvers which are widely used at the present time are crude ethylene-propylene copolymers which are dissolved in mineral oil or lubricating oil to form a concentrate and the resulting viscous solution added to motor oils and other oils as viscosity index improvers. Such material are described in U.S. Pat. No. 3,598,738, issued to Charles B. Biswell et al. on Aug. 10, 1971; U.S. Pat. No. 3,560,384, issued Feb. 2, 1971, to Robert A. Halling and U.S. Pat. No. 3,679,830, issued July 25, 1972, to Charles B. Biswell et al.

In present practice where the viscosity index improver is added to lubricating oil, the contribution of the improver immediately begins to deteriorate during operation. Thus, at some point prior to the end of the useful life of the oil, the oil has thinned out and the improver is no longer effective. U.S. Pat. No. 3,336,223, issued Aug. 15, 1967, to P. D. Kneeland teaches an oil filter useful for maintaining an effective concentration of additives in oil.

SUMMARY OF THE INVENTION

According to the present invention there is provided in combination with an oil filter having a filter element the improvement which comprises an oil-soluble, solid oil viscosity index improver disposed in said filter upstream from the filter element, and means in association with said improver to limit contact of the surface of the improver with circulating oil.

A process for improving the viscosity index of oil over its normal useful life is also provided. The process comprises contacting the oil with the above-described oil viscosity index improver so as to control its dissolution rate. This is done by limiting the surface area of the improver exposed to circulating oil.

DETAILED DESCRIPTION OF THE INVENTION

The present invention provides an oil filter which will continually add viscosity index improver material to oil, particularly to the lubricating oil of an internal combustion engine during periods of operation. This improvement reduces the tendency of the oil to "thin out" with use.

Figure 1:
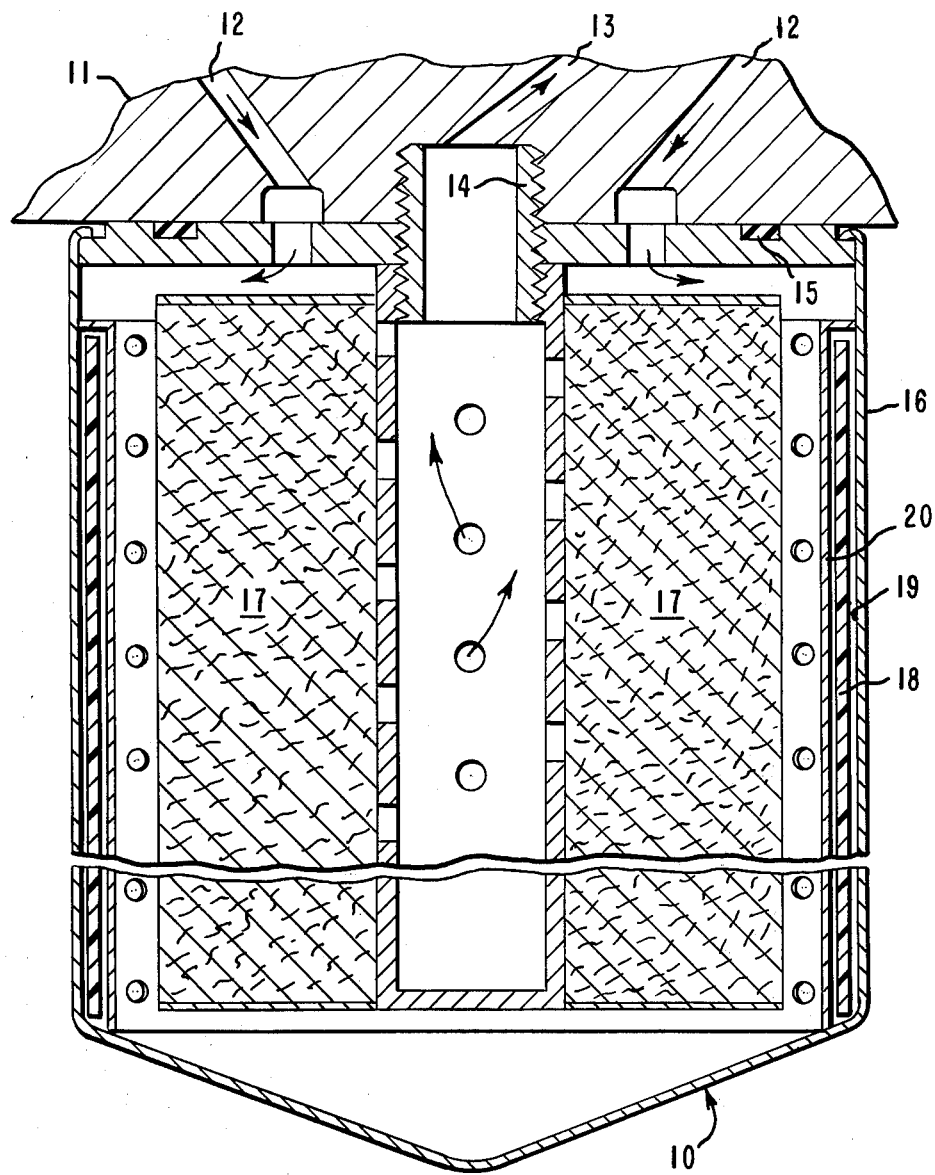
FIG. 1 is a cross-sectional view of an oil filter attached to an engine block. The oil filter is a conventional spin-on type of filter that is completely replaceable.

With reference to FIG. 1, an oil filter 10 is shown attached to engine block 11 having oil outlet ports 12 and oil inlet port 13 which is a tapped hole to which the filter is screwed onto the stud portion 14. A gasket 15 seals the filter to the block. A filter of this type is completely replaceable and is referred to as a spin-on type of oil filter.

The oil filter itself has an outer casing 16 which is usually of some metal such as steel. Various types of plastic materials which are oil-insoluble can also be used. The filter element 17 is usually constructed of paper and is placed in the center of casing 16 so as to leave an annular passage around the element for incoming circulating oil. Oil then passes through the element and returns to the engine through inlet port 13.

The viscosity index improver is added to the oil filter as an oil-soluble, solid material, preferably a polymer, which dissolves in the heated, circulating oil at rates proportional to contact area, circulation rate and temperature. In the oil filter of the invention, the polymer is disposed upstream from filter element 17, preferably as a sheet 18 lining the inner side walls 19 of casing 16. The polymer is used in association with means to limit contact between the polymer and circulating oil. Preferably, a perforated, thin metal liner 20 is inserted over the polymer sheet 18 so as to be at the polymer-oil interface. The perforations can be any shape, e.g., circular, triangular, rectangular, oblong, and of a size such that when used with a polymer of specified viscosity and dissolution rate, the polymer will dissolve in the oil throughout its normal useful life. Normal useful life as used herein means the time period recommended by automobile manufacturers between oil changes. For example, for some automobiles it is 4,000 miles or 4 months whichever comes first.

Figure 2:
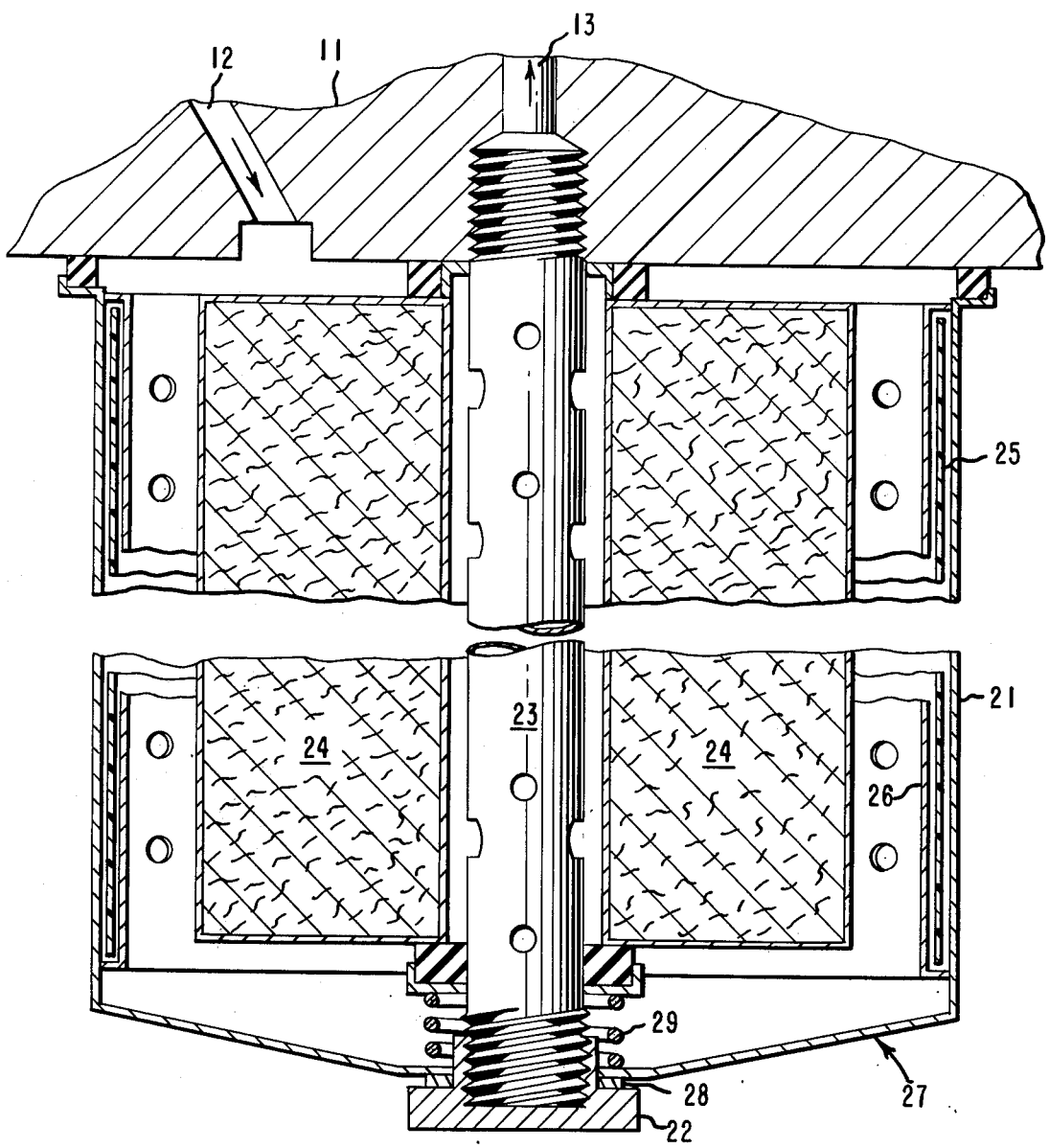
FIG. 2 is a cross-sectional view similar to FIG. 1 except the filter is the older type wherein only the filter element is replaceable. The outer casing is removable to replace the filter element.

The oil filter 27 shown in FIG. 2 functions in the same manner as the oil filter of FIG. 1. The only difference is that outer casing 21 is removable by removing wing-nut 22 and washer 28 from threaded post 23. Filter element 24 is then replaced by a new element and casing 21 replaced. Spring 29 maintains pressure on filter element 24. As in FIG. 1, a sheet 25 of viscosity index improver is placed between casing 21 and perforated sheet 26. With the oil filter of FIG. 1, the sheet of viscosity index improver and perforated metal sheet are built into each replaceable oil filter while with the oil filter of FIG. 2, a new sheet of viscosity index improver has to be inserted separately at the time of oil change.

The solid oil viscosity index improvers useful in the oil filter of the invention must be oil-soluble. This means that the improvers must be capable of being dissolved in hot circulating oil (usually 200° to 250°F. for circulating lubricating oil) and remain dissolved at ambient temperatures.

Particularly useful and preferred improvers are ethylene/propylene copolymers containing up to 10% by weight of 1,4-hexadiene. It is preferred that the ethylene content be between about 25 and 55% by weight and the propylene content be between 35 and 75% by weight. These copolymers and other such useful ethylene/propylene copolymers are described in U.S. Pat. No. 3,598,738, the disclosure of which is hereby incorporated by reference. Other useful copolymers of ethylene and propylene are described in U.S. Ser. No. 319,898 filed Dec. 29, 1972, in the names of J. B. Campbell et al and assigned to the assignee of this application. This pending application is hereby incorporated by reference.

The polymeric improvers described in the aforesaid U.S. Pat. Nos. 2,114,233; 2,737,496; 2,130,507 and 2,072,120 can be used in the oil filter of the invention. The disclosures of these patents are hereby incorporated by reference.

Some of the ethylene/propylene copolymers useful in the oil filter of this invention are commercially available. For copolymers not so available, they can be prepared by known polymerization processes using coordination (Ziegler) catalysts, the vanadium components being soluble in hydrocarbon solvents such as hexane. Low molecular weights can be obtained by adding hydrogen to the polymerization reactor as is known in the art.

Additives can be mixed with the solid oil viscosity index improver and thus added to the oil during oil circulation through the filter. Illustrative additives are antioxidants, corrosion inhibitors, detergents, film strength agents, neutralizing agents and sludge inhibitors. By using the oil filter of the invention with solid oil viscosity index improver contained therein, with or without other additives, it may be feasible to use less expensive oil and upgrade it during use.

The invention can be further understood by the following examples in which parts and percentages are by weight unless otherwise indicated.

EXAMPLE 1

A commercial, spin-on replaceable oil filter of the type shown in FIG. 1 was altered so as to allow access to the interior. A sheet of crude ethylene-propylene rubber (about ⅛-inch thick) composed of 52% ethylene, 44% propylene and 4% of 1,4-hexadiene having a inherent viscosity of 2.1 as measured on a solution of 0.1 gm. of rubber in 100 ml. of tetrachloroethylene at 30°C. and a Mooney value of 40 (ML-1+4 (121°C.) was inserted inside the outer casing of the oil filter. Over the rubber sheet was placed a brass shim stock perforated with about 27 random holes about one-fourth inch in diameter.

An SAE-30 oil was circulated through the oil filter from a 5 quart sump at about 1 gal./min. for a period of over 90 hours. The oil was heated to a temperature between about 90° and 120°C. About 2 to 4 oz. of rubber was dissolved in the oil during this period.

EXAMPLE 2

A commercial spin-on replaceable oil filter of the type shown in FIG. 1 was altered by placing a sheet 11 × 4½ × ⅛ inch (about 4 oz.) of the crude ethylene-propylene rubber used in Example 1 inside the outer casing of the oil filter. A sheet of brass shim stock having 40 holes about one-fourth inch in diameter was placed over the rubber sheet.

A 500-hour test was conducted using 5 quarts of Sunvis 51 oil (SAE-30) circulating at 1 gal./min. at about 105°C. After 500 hours, all but about 3–6% of the rubber sheet was dissolved. No change in the filter element was noted and no rubber was found in the oil filter casing.

The oil viscosity initially was approximately 200 centistokes at 25°C. and about 12–13 centistokes at 93°C. After 500 hours of operation the oil viscosity was about 325 centistokes at 25°C. and about 35–40 centistokes at 93°C.

What is claimed is:

1. In an oil filter, for use with an internal combustion engine using circulating lubricating oil, having an outer casing and a filter element disposed in said casing to provide an annular passage around said element the improvement comprising:
    1. a sheet of an oil-soluble, solid ethylene copolymer comprising about 25 to 55% by weight ethylene, 35 to 75% by weight propylene and up to 10% by weight of 1,4-hexadiene lining the inner side walls of said casing and
    2. a perforated metal sheet overlaying the copolymer sheet, said perforations of a size to limit contact of the copolymer sheet with the circulating oil over its normal life.

* * * * *